US006749938B2

(12) United States Patent
Damico et al.

(10) Patent No.: US 6,749,938 B2
(45) Date of Patent: Jun. 15, 2004

(54) LOW READ-THROUGH EPOXY-BONDED SMC

(75) Inventors: Dennis J. Damico, Erie, PA (US); David R. Pugne, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/008,771

(22) Filed: Nov. 13, 2001

(65) Prior Publication Data

US 2003/0121606 A1 Jul. 3, 2003

(51) Int. Cl.$^7$ ................................................ B32B 27/38
(52) U.S. Cl. ........................ 428/413; 428/418; 222/129
(58) Field of Search ............................... 428/413, 418; 222/129

(56) References Cited

U.S. PATENT DOCUMENTS

| | | |
|---|---|---|
| 2,750,395 A | 6/1956 | Phillips et al. |
| 2,890,194 A | 6/1959 | Phillips et al. |
| 3,018,262 A | 1/1962 | Schroeder et al. |
| 4,129,670 A | 12/1978 | Riew |
| 4,447,579 A | 5/1984 | Takagi et al. |
| 4,578,424 A | 3/1986 | Goel |
| 4,695,605 A | 9/1987 | Goel |
| 4,740,539 A | 4/1988 | Goel |
| 4,803,232 A | 2/1989 | Shah |
| 4,921,912 A | 5/1990 | Sagawa et al. |
| 5,019,608 A | 5/1991 | Shah |
| 5,385,990 A | 1/1995 | Abbey et al. |
| 5,929,141 A | 7/1999 | Lau et al. |
| 6,451,876 B1 * | 9/2002 | Koshy ........................ 523/219 |

* cited by examiner

Primary Examiner—Daniel S. Metzmaier
Assistant Examiner—Chistopher Keehan
(74) Attorney, Agent, or Firm—Miles B. Dearth

(57) ABSTRACT

What is disclosed is a 2-part epoxy adhesive composition comprises an epoxy compound, an optional amine hardener, optional hydroxy-substituted aromatic compound, and from 20% to 60% of the total weight of adhesive combined of liquid terminal epoxy reactive groups and amidoamine, whereby the adhesive is applied as a mixture of first and second parts in a volume ratio of the first epoxy part: second cure part of 1:1.4 to 1:3.0. The adhesive is adapted to provide bonding of SMC with low or no read-through, initial and aged fiber tearing bonds and specified bond strength minimum at 400° F. (204° C.).

18 Claims, No Drawings

LOW READ-THROUGH EPOXY-BONDED SMC

BACKGROUND OF THE INVENTION

The automobile industry utilizes outer skin/body panels made from sheet molding compounds (SMC) as an alternative to steel panels in an effort to reduce weight and corrosion susceptibility of the vehicle, i.e., an automobile, van, truck or the like. Sheet molding compound is typically comprised of various resin compositions such as a polyester resin reinforced with, for example, glass fibers. The sheet molding compound is molded under heat and pressure in order to prepare a rigid, fiber-reinforced structure. Structural assemblies of body panels based on sheet molding compounds requires the use of curable adhesive compositions to affix or bond the panel to structural metal or composite fixtures. The bond formed by the adhesive between the SMC panel and structural member must meet certain adhesion and aesthetic requirements. After being bonded for use in automobile applications, the bonded SMC is often exposed during paint bake cycles to temperatures of 205° C. for periods of time up to one hour. Surface imperfections occur in the use of bonding adhesives.

Certain structural adhesive compositions based on epoxy curing compounds used for bonding SMC for automotive shaped bodies, e.g. body panels, among other vehicle subassemblies are disclosed in U.S. Pat. Nos. 4,578,424; 4,695,605; 4,740,539; 4,803,232; and 4,921,912. Many traditional epoxy-based structural adhesive compositions such as those disclosed in the above patents suffer from the disadvantage of undergoing foaming or disintegration during the high temperature paint baking process. This foaming or disintegration of the adhesive composition can cause cohesive failure of the adhesive or interfacial failure between the parts being bonded, rendering them undesirable for industrial applications.

Epoxy adhesives of the state of the art exhibit bond line shrinkage which is referred to herein as "read-through" in the exposed SMC surface from underlying bond line on the backside of the panel. This imperfection can occur in original equipment manufacture or in the repair of damaged panels and appears as a slight crevasse along the bond line. Noticeable read-through is commercially unacceptable and requires sanding, and/or refilling prior to painting of the body panel.

U.S. Pat. No. 5,929,141 discloses a one-component, flexible epoxy adhesive useful as an encapsulant comprising the following components: (a) at least one polyepoxide resin having a hardness not exceeding a Shore D durometer reading of about 45 when cured with a stoichiometric amount of diethylene triamine; (b) a substantially stoichiometric amount of curing agent including at least one amine-terminated butadiene-acrylonitrile polymer; and (c) an electrically-conductive filler.

U.S. Pat. No. 5,385,990 discloses an epoxy structural adhesive useful for bonding of paint-baked SMC, and comprising an epoxy component; an amine hardener, selected from the group consisting of polyamidoamines, aliphatic polyamines, alicyclic polyamines, tertiary amines and mixtures thereof; and a hydroxy-substituted aromatic compound having a specified pKa and boiling point range. In a worked example the first Part contains 60 parts of diglycidyl Ether of bisphenol A and 39 parts of talc, and the second part contains:

4.29 parts of diethylenetriamine
19.36 parts of a polyamidoamine (1)
9.5 parts of p-Chlorophenol
34.15 parts of ATBN (liquid nitrile polymer) (2)
and 32.68 parts of talc.

The first and second parts are metered and mixed together in a volume ratio of 1:1.25. This adhesive formulation contains 29.7 wt. % of (1) and (2) and results in unacceptable read-through on SMC.

U.S. Pat. No. 5,019,608 discloses rubber toughened epoxy adhesives. In a worked example Component A and Component B are as follows:

|  | Grams |  |
|---|---|---|
| Component A: |  |  |
| Bisphenol A epoxy resin (Epon ® 828 of Shell Chemical Co.) | 32.5 |  |
| Epi-Rez ® (Celanese Corp., a 60/40 blend of Epon ® 828 and polyacrylate ester)* | 19.8 |  |
| Diethylene glycol | 1.3 |  |
| Fumed silica | 1.7 |  |
| $TiO_2$ | 0.8 |  |
| White Talc | 43.9 |  |
| Component B: |  |  |
| Genamid ® 2000 | 26.1 | (1) |
| ATBN 1300X42 | 45.6 | (2) |
| White Talc | 11.5 |  |
| Aluminum Powder | 14.0 |  |
| Fumed Silica | 2.8 |  |

The first and second parts are metered and mixed together in a weight ratio of 1:1.09. This adhesive formulation contains 33.9 wt. % of (1) and (2) and results in unacceptable read-through on the surface of SMC bonded to a substrate.

A need exists for a structural adhesive composition which can withstand high temperature paint bake conditions and which improves bond shrinkage over state of the art approaches as to avoid costly and time-consuming repair or rebonding. SMC panels of gauge thickness of 125 mils, the current auto industry standard. A panel gauge thickness of 90–110 mils, especially 90–100 mils is desirable. Such gauge thickness of 110 mils or less, especially with "toughened" SMC compounds places an added burden on the adhesive composition to achieve the critical performance parameters of good (i.e, low or no) read-through, and a bond strength of at least 200 p.s.i. at 180° F., and at least 44 p.s.i. bond strength at 400° F., along with fiber tearing bonds after long term water soaking of the bonded composite. Present epoxy adhesives used to bond thinner gauge SMC show undesirable read-through. A Balance of adhesive bond performance and read-through is needed.

SUMMARY OF THE INVENTION

The present invention is an epoxy adhesive composition that meets the critical requirements for bonding conventional SMC panels, and especially SMC panels, outer-body skins, and the like, to structural supporting substrates, the panels preferably having a thickness of 90–110 mils (0.009–0.010 in.). The preferred panels are further subjected to E-coat paint-baking conditions after bonding to the substrates takes place. According to the invention a two-part epoxy adhesive that has acceptable SMC read-through and bonding performance exhibits a Young's modulus in a critical range of from 25,000 to 200,000, psi, when the adhesive contains a wt. % total of liquid rubber and polyamide and/or polyamidoamine of from 20% to 60 wt. % on total adhesive weight and the adhesive is proportioned in the epoxy side (A) to curative side (B) in a volume ratio range of from 1:1.4 to 1:2.2.

In another aspect, the invention is directed to a bonded shaped body of sheet mold compound, having one surface which is a class A surface, and a backside surface which is bonded to a substrate with an epoxy adhesive in mix-proportioned parts, wherein said adhesive contains a liquid elastomer having a terminal epoxy-reactive group, and the adhesive part A comprises an epoxy compound, and part B comprises a polyamide or polyamidoamine. The adhesive contains from 30 to 60 wt. % combined of a liquid epoxy-reactive elastomer and polyamide or polyamidoamine and is applied to bond the shaped body in a volume mix-proportion ratio of part A to part B of from 1:1.4 to 1:3.0.

DETAILED DESCRIPTION OF THE INVENTION

The present 2-part epoxy adhesive composition comprises an epoxy compound, an optional amine hardener, optional hydroxy-substituted aromatic compound, and from 20% to 60% of the total weight of combined adhesive of polyamide and/or polyamidoamine and a liquid epoxy-reactive terminal group containing elastomer. The most preferred liquid elastomers contain epoxy-reactive volume:volume ratio of the first epoxy (A) part to second curative (B) part of from 1:1.4 to 1:3.0, and preferably from 1:1.8 to 1:2.5.

The epoxy compound of the present invention can be any compound that contains an epoxy group having the formula:

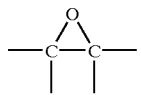

has a viscosity of about 200 centipoise or higher at 25° C. Such epoxy materials include monomeric epoxy compounds and epoxide resins of the polymeric type and can be aliphatic, cycloaliphatic, aromatic or heterocyclic. These materials generally have, on the average, at least 1.5 polymerizable epoxy groups per molecule (preferably two or more epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

The epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom which is reactive with an oxirane ring at room temperature. Illustrative of permissible substituent groups include halogens, ester groups, ethers, sulfonate groups, siloxane groups, nitro groups, phosphate groups, etc. The molecular weight of the epoxy-containing materials may vary from about 50 to 100,000 or more. Mixtures of various epoxy-containing materials can also be used in the compositions of this invention.

The epoxy compounds of the present invention may be cycloaliphatic epoxides. Examples of cycloaliphatic epoxides include diepoxides of cycloaliphatic esters of dicarboxylic acids such as bis(3,4-epoxycyclohexylmethyl) oxalate, bis(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

Further epoxy-containing materials which are particularly useful in the practice of this invention include glycidyl ether monomers of the formula:

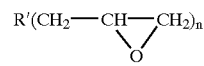

where R' is alkyl or aryl and n is an integer of 1 to 6. Examples are glycidyl ethers of polyhydric phenols obtained by reacting a polyhydric phenol with an excess of chlorohydrin such as epichlorohydfin [e.g., the diglycidyl ether of 2,2-bis(4-hydroxyphenyl)-propane]. Further examples of epoxides of this type which can be used in the practice of this invention are described in U.S. Pat. No. 3,018,262, and in "Handbook of Epoxy Resins" by Lee and Neville, McGraw-Hill Book Co., New York, 1967, both the disclosures of which are incorporated herein by reference.

The commercially available epoxy resins can be used as the epoxy compound in this invention. In particular, epoxy compounds which are readily available include octadecylene oxide, glycidylmethacrylate, diglycidyl ether of bisphenol A (e.g., those available under the trade designations EPON® 828, EPON 1004 and EPON 1010 from Shell Chemical Co., DER-331, DER-332, and DER-334, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexylmethyl-3,4-epoxy-6methylcyclohexene carboxylate (e.g., ERL-4201 from Union Carbide Corp.), bis(3,4-epoxy-6-methylcyclohexylmethyl) adipate (e.g. ERL-4289 from Union Carbide Corp.), bis(2,3-epoxycyclopentyl) ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON® 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenol-formaldehyde novolak (e.g., DEN-431 and DEN-438 from Dow Chemical Co.), and resorcinol diglycidyl ether (e.g., KOPOXITE® from Koppers Company, Inc.).

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylateglycidylacrylate and a 62.5:24:13.5 methylmethacrylate-ethyl acrylateglycidylmethacrylate.

The epoxy compound used in the present invention is typically utilized in an amount ranging from about 10 to 40, preferably from about 10 to 30, percent by weight of the total proportion of adhesive.

Amine hardeners are optional, but preferably utilized in the present invention, and may be any substance generally known as an amine-type curing agent for epoxy resins. For example, aliphatic polyamines, alicyclic polyamines, tertiary amines and various mixtures thereof are used for this purpose. Examples of amine hardeners for purposes of the present invention include diethylenetriamine, triethylenetetramine, tetraethylenepentamine, 2-methyl-1,5-pentanediamine, diethanolamine, methyldiethanolamine, triethanolamine, pentaethylenehexamine, ethylenediamine, tetramethylenediamine, hexamethylenediamine, polyetherdiamine, bis-hexamethylenetriamine, diethylaminopropylamine, trimethylhexamethylenediamine, oleylamine, dipropylenetriamine, 1,3,6-tris-aminomethylhexane, 3,9-bis(3-aminopropyl)-2,4,8,10-tetraoxaspiro[5,5]-undecane, 1,3-bis-aminomethylcyclohexane, bis(4-aminocyclohexyl)-methane, bis(4-amino-3-methylcyclohexyl)methane, isophoronediamine, N-aminoethylpiperazine, and the like. Aliphatic polyamines which are modified by adduction with epoxy resins or acrylonitrile, or by condensation with fatty acids can also be utilized as amine hardeners. In addition, various Mannich bases can be employed as amine hardeners for purposes of the present invention.

Aromatic polyamines wherein the amine groups are directly attached to the aromatic ring, such as xylene diamine and the like, can also be used in the practice of the invention but are less preferred to the aliphatic diamines. Examples of aromatic polyamines include diaminophenylmethane, aniline-formaldehyde low molecular weight condensate, m-phenylenediamine, diaminodiphenyl-sulfone, and the like.

Unhindered aliphatic amine hardener herein refers to an amine compound containing a primary amine group attached to a primary carbon atom. The amine hardener may optionally be utilized in an amount ranging from about 10 to 50, preferably from about 20 to 40, percent by weight of the essential ingredients of the adhesive composition.

A polyamide and/or polyamidoamine is an essential component of the adhesives disclosed herein. Polyamides useful for epoxy adhesives are comprised of the reaction products of dimerized fatty acid (dimer acid) and polyethyleneamines. Polyamides have viscosities generally in the range of about 100 to 700 cP. The dimer acid is prepared by the acid catalyzed oligomerization of monomeric fatty acids, usually tall oil fatty acid, or other vegetable acid. Commercial products generally consist of mostly (>70%) dimeric species, with the rest consisting mostly of trimers and higher oligomers, along with less than 5% of monomeric fatty acids. Any of the higher polyethyleneamines can be employed in the preparation of polyamides, such as diethylenetriamine, triethylenetetramine, tetraethylenepentamine, or pentaethylenehexamine, though in actual commercial practice the polyethyleneamine most commonly employed is triethylenetetramine. Polyamidoamines are formed by the reaction of monomeric fatty acid such as tall oil fatty acid and a polyethyleneamine. The polyethyleneamine most commonly employed in this case is tetraethylenepentamine, even though triethylenetetramine is a less expensive raw material. Polyamidoamines based on tetraethylenepentamine yields a compound which is liquid at ambient temperatures. Polyamidoamines based on triethylenetetramine generally have a marked tendency to crystallize at room temperature. Polyamide and polyamidoamines are well known and commercially available. A typical example is VERSAMID® 140 (Henkel, USA) which is a polyamidoamine of dimerized linoleic acid and UNIREZ® 2140 polyamide resin available from Arizona Chemical. The amount of polyamide or polyamidoamine in the adhesive composition ranges from 10% to 30% of the total, by weight. The weigh ratio of combined polyamide and/or polyamidoamine and liquid rubber to epoxy compound is from 1:4 to 2:1 and preferably from 1:1 to 1.8:1.

Optional epoxy accelerators are described in H. Lee and K. Neville, Handbook of Epoxy Resins, McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris(dimethylaminomethyl)phenol. The preferred optional accelerators are selected from compound having at least one hydroxy substituent on a 5- or 6-membered heterocyclic or nonheterocyclic, monocylicic or multicyclic aromatic ring containing an electron-withdrawing group on the ring. Specific examples of electron-withdrawing groups include —Cl, —$NO_2$, —$CF_3$, —$CO_2R$, —$CH_2OR$, —CN, and —$SO_2R$, where R is an alkyl radical having from 1 to 5 carbon atoms or aryl and R is preferably a methyl, ethyl, propyl or phenyl group.

Specific examples of preferred hydroxy-substituted aromatic compounds include halogenated (chloro or bromo-) phenolic compounds, hydroxy benzoic acid esters, hydroxy-substituted naphthalenes, hydroxy-substituted pyridines, hydroxy-substituted pyrimidines, and hydroxy-substituted quinolines. Examples of preferred halogenated phenolic compounds include p-chlorophenol, 3-chloro-4-fluorophenol, 3,4-dichlorophenol, and 3,4-difluorophenol with p-chlorophenol being most preferred.

The optional hydroxy-substituted aromatic compound can be utilized in an amount ranging from about 2 to 20, preferably from about 5 to 15 percent by weight of the adhesive composition. The hydroxy-substituted aromatic compounds of the present invention may be prepared by methods well known to those skilled in the art and many of the hydroxy-substituted aromatic compounds are commercially available.

A reactive liquid elastomer, such as carboxy-or amine-functional liquid rubber component is essential in the present invention. The reactive liquid elastomer component must contain terminal epoxy-reactive groups, such as amine- or carboxy-, groups. A variety of rubbery liquid polymers can be adapted using well-known techniques to contain epoxy-reactive sites, such as on polyalkadienes, and polyurethanes. The principal epoxy-reactive groups are amine and carboxyl groups, and are preferredly located on the terminal portions of the rubbery polymers. The most preferred liquid rubbers are amine-terminated polyalkadiene (e.g., butadiene)-acrylonitrile copolymer rubbers, which are used in the curative or B-side. A carboxy-terminal butadiene-acrylonitrile copolymer can alternatively be premixed or reacted with an epoxy compound and utilized in the epoxy- or A-side.

The amine-terminated butadiene-acrylonitrile copolymer rubbers are particularly preferred for use in the invention and are liquid elastomers that normally have an acrylonitrile content of about 5 to 40, preferably about 10 to 26 percent by weight and a butadiene content of about 95 to 60, preferably about 90 to 74 percent by weight, based on the liquid butadiene-acrylonitrile copolymer. Generally, the amine-terminated butadiene-acrylonitrile copolymers contain an average from about 1.7 to 3 primary and/or secondary amine groups per molecule, preferably about 1.7 to 2.3 primary or secondary amine groups per molecule and may have Brookfield viscosities measured at 27 degree. C. of about 500 cps to 2,500,000 cps, preferably about 500 cps to 500,000 cps. The amine-terminated butadiene-acrylonitrile copolymers of the invention are well known articles of commerce and can be prepared by reacting a carboxyl-terminated or ester-terminated butadiene-acrylonitrile copolymer with at least one aliphatic, alicyclic or heterocyclic amine containing at least two primary and/or secondary amine groups. The amine-terminated liquid copolymers may also be prepared by reacting an acid chloride-terminated butadiene-acrylonitrile with at least one of the aforementioned amines. Methods for preparing amine-terminated butadiene-acrylonitrile copolymers are described in more detail in, for instance, U.S. Pat. No. 4,129,670, which is incorporated herein by reference. Commercially available amine-terminated butadiene-acrylonitrile copolymer rubbers can be obtained under various tradenames including Hycar® ATBN (B. F. Goodrich Co.), H-3932 (ACR Co.), and X-3995 (ACR Co.). The amount of liquid, terminal epoxy-reactive elastomer used can range from 5 to 25 wt. % of the combined proportions of the adhesive.

The total of polyamide/amidoamine and liquid rubber components must be employed in an amount ranging from 20 to 60 wt. %, and more preferably from about 22 to 30 wt % of the adhesive composition, and the adhesive proportions lie within the critical volume mixing ratio of epoxy-side to curative-side in order to achieve the bond performance and read-through quality in bonding SMC set forth herein. A cured adhesive modulus must be kept within a range of from 25,000 to 200,000 psi, and more preferably from 25,000 to 125,000 psi. A modulus of below about 25,000 fails adhesive bond performance, awhile a cured adhesive modulus of above 200,000 show unacceptable read-through, on the class A surface subject to paint bake cycles.

The present adhesive composition is utilized as a two-part adhesive composition where the first part comprises the epoxy compound while the second part comprises the hardener. The adhesive is made into a paste-like consistency by the use of fillers and/or thixotropic additives.

The adhesive compositions of the invention are non-conductive and do not contain appreciable amounts of conductive fillers. Conventional additives normally found in epoxy adhesives, in paste form, utilize fillers such as talc, and/or titanium dioxide, and/or wetting agents, and the like. Such additives are incorporated in conventional amounts known to practitioners in the art of epoxy adhesives. Talc and silica are preferred in combination.

The non-sag characteristics of the present adhesive compositions can be enhanced by other methods including the reaction of a small amount of polyisocyanate with the amine hardener as is disclosed in U.S. Pat. No. 4,695,605, the disclosure of which is incorporated herein by reference.

In order to achieve the critical performance parameters for bonding SMC as low or no read-through, a bond strength of at least 200 p.s.i. at 180° F., and at least 44 p.s.i. at 400° F., and fiber tearing bonds after long term water soaking, the two parts of the adhesive composition are metered and mixed together immediately before use in a critical mix weight ratio of the first part: second part ranging from 1:1.4 to 1:3.0, and preferably from 1:1.8 to 1:2.5. After mixing the parts, the adhesive is sufficiently viscous to form a self-supporting bead when extruded onto the SMC surface. The adhesive exhibits an open time of at least 10 minutes at ambient temperature. A bead of adhesive is applied to at least one of the SMC or structural surfaces to be bonded, the parts are mated together and the assembly is heated at a temperature in the range from about 70° C. to 190° C. for about 1 minute to 1 hour, and preferably from about 5 to 40 minutes. While the adhesives can be applied by hand-mixing and spreading such as with a spatula, any conventional mix-apply method such as by roll coater, brush, curtain coater, extrusion or hand roller, meter mix-dispensers, and robotic dispensing machines as are commonly employed industrially are preferred.

The two-part epoxy adhesive is conveniently dispensed using conventional meter mix-dispensing equipment, from first and second pails or drums holding the respective parts. Conventional meter mix-dispensers utilize first and second pumps to pump the parts A and B, respectively, from the first and second containers. Component A is pumped through a first supply tube into a first metering chamber of a metering device through a first inlet valve. Part B is pumped from its container through a second supply tube into a second metering chamber of the metering device through a second inlet valve. First and second valve members are operated by compressed air tubes where the parts are displaced from first and second metering chambers through exit valves and then into application tubes connecting to an adhesive application gun. The adhesive gun has left and right halves operated by compressed air tubes and forces the precisely metered volume ratio of materials into an elongated mixing nozzle and the resulting mixture is applied to a the parts to be adhesively joined. A conventional meter mix-dispenser is more fully described in U.S. Pat. No. 5,470,416, the description of which is incorporated herein by reference.

The adhesives of this invention are especially suited to bonding fiber reinforced unsaturated resin sheet molding compound (SMC) parts to other SMC parts or structural metal members. When utilized to bond SMC body panels, the adhesive is applied between the parts to be bonded and the parts are mated together and subjected to a bonding cycle ranging from about 1 to 10 minutes at temperatures ranging from about 90° C. to 150° C. After cure is completed, the bonded SMC can be subjected to paint bake cycles at temperatures ranging from about 135° C. to 205° C. for a period of time typically from about 20 minutes to 1 hour.

The following examples are provided for purposes of specifically illustrating the invention and are not intended to limit in any manner the scope of the present invention.

EXAMPLES

Testing:

The ASTM test method for Young's Modulus is ASTM D882-91 modified by the use of a 2 inch initial grip separation instead of the grip separation lengths called out in the actual test method.

The shear adhesion strength is obtained through ASTM D3163.

Samples are conditioned for 30 min at following conditions:
1) Test at 23+/−2° C. (Minimum 2.8 MPa)
2) Test at 204+/−1° C. (Minimum 0.3 MPa)
3) 7 day water immersion at 23° C.+/−2° C.; (Minimum 2.8 MPa)

Rate of Bond Strength

−1"×4" SMC coupons are bonded at 1"×1"×0.030" and placed in a 180° F. oven. The lap shear strength is checked at various time intervals.

Bead Gel time:

A ½"×½" bead of adhesive is drawn, placed in a 180° F. oven, and "cut" with a tongue depressor at various time intervals until the adhesive "pulls" instead of cuts. This simulates open time.

Sag

A ½"×½" bead of adhesive is drawn on a metal panel. The panel is placed at vertical for 1 hour, and the amount of sag is measured at the completion of this time.

TABLE 1

| | (weight parts) | | | | | |
|---|---|---|---|---|---|---|
| Raw Material | Comp. A | B | C | D | Comp. E | Comp. F |
| (1) Polyamido-amine | 12.75 | 14.89 | 16.40 | 17.54 | 18.22 | 19.13 |
| Para-Chloro-phenol | 4.78 | 5.58 | 6.15 | 6.58 | 6.83 | 7.17 |
| (2) Hycar ® ATBN 1300 × 21 | 5.95 | 6.94 | 7.65 | 8.18 | 8.50 | 8.93 |
| Talc | 42.23 | 42.98 | 43.52 | 43.93 | 44.17 | 44.50 |
| Diethylene Tri-amine | 0.96 | 1.11 | 1.23 | 1.31 | 1.36 | 1.43 |
| Fumed Silica | 3.30 | 3.10 | 2.96 | 2.86 | 2.79 | 2.71 |
| Carbon black | 0.05 | 0.06 | 0.07 | 0.07 | 0.08 | 0.08 |
| Polyoxyalkyl-ene Diamine | 1.06 | 1.24 | 1.37 | 1.46 | 1.52 | 1.59 |
| Araldite ® GY6010 | 28.47 | 23.72 | 20.33 | 17.79 | 16.27 | 14.23 |
| Ti O$_2$ | 0.45 | 0.38 | 0.32 | 0.28 | 0.26 | 0.23 |
| Total | 100. | 100. | 100. | 100. | 100. | 100. |
| volume Ratio A:B | 1:1 | 1:1.4 | 1:1.8 | 1:2.2 | 1:2.5 | 1:3 |
| Final wt % of (1) + (2) | 18.70 | 21.83 | 24.05 | 25.72 | 26.72 | 28.06 |
| Room Temp. Pull (destructive bond) | 481 psi FT | 564 psi FT | 584 psi FT | 771 psi FT | 666 psi FT | 642 psi FT/C |
| 180° F. Pull (p.s.i.) (destructive bond) | 589 psi FT | 437 psi FT/TFC | 324 psi TFC | 230 psi TFC | 207 psi C/A | 164 psi C/A Unacceptable |
| After 10 Days H$_2$O soak (destructive bond) | 476 psi FT | 541 psi FT | 752 psi FT | 712 psi FT | — | — |
| After 10 Days Humidity (destructive bond) | 419 psi FT | 487 psi FT | 707 psi FT | 574 psi FT | — | — |
| −29° C. Pull (desctructive bond) | 554 psi FT | 637 psi FT | 588 psi FT | 524 psi FT | — | — |
| 204° C. Pull | 59 psi A | 47 psi A | 44 psi A | 42 psi A | — | — |
| 1 Day Aging at 88° C. | 522 psi FT | 502 psi FT | 541 psi FT | 639 psi FT | — | — |
| 240 Hour Salt Spray | 454 psi FT | 523 psi FT | 776 psi FT | 717 psi FT | — | — |
| Young's Modulus (psi) | 223,511 | 200,033 | 102,092 | 28,070 | 11,461 | 2,730 |
| Read-through | Poor | Fair | Good | Good | Good | Good |

Failure modes:
C = Cohesive Failure
FT = Fiber Tear
TFC = Thin Film Cohesive Failure
A = Adhesive Failure
C/A = Cohesive and Adhesive failure As shown in the above table, examples A, B, C, and D exhibit fiber tearing bonds after the adhesive bonds are exposed to RT, water soak, humidity, −29° C., 88° C., and salt spray. They also result in minimum bond strengths of 200 psi at 180° F. and 44 psi at 204° C. (with sample D slightly lower than the minimum at 204° C.). Also, the lowest read-through results obtained were with examples C, D, E, and F; with overall best read through results occurring with examples C and D.

It is understood that the foregoing description of preferred embodiments is illustrative, and that variations may be made in the present invention without departing from the spirit and scope of the invention. Although illustrated embodiments of the invention have been shown and described, a lattitude of modification, change and substitution is intended in the foregoing disclosure, and in certain instances some features of the invention will be employed without a corresponding use of other features. Accordingly, it is appropriate that the appended claims are to be construed in a manner consistent with the scope of the invention.

What is claimed is:

1. A bonded shaped body of sheet mold compound, exhibiting a class A surface, and a backside surface bonded to a substrate, said class A surface exhibiting improved read-through, said shaped body bonded to a substrate with an epoxy adhesive in two mix-proportioned parts A and B, wherein said adhesive contains a liquid elastomer having a terminal epoxy-reactive group, and wherein part A comprises an epoxy compound, and part B comprises a polyamide or polyamidoamine, wherein said adhesive contains from 20 to 60 wt. % combined of said elastomer and said polyamide and/or polyamidoamine, said adhesive volume mix-proportion ratio of part A to part B is from 1:1.4 to 1:3.0.

2. The bonded shaped body of claim 1 wherein the cured adhesive per se, has a Young's modulus of from 25,000 to 200,000.

3. The bonded shaped body of claim 1 wherein the mix-proportion is from 1:1.8 to 1:2.5.

4. The bonded shaped body of claim 1 in the form of a panel bonded to said substrate, said panel has a thickness of from 90–110 mils.

5. The bonded shaped body of claim 1 wherein said elastomer is a carboxy-terminated nitrile-butadiene copolymer and is present in part A of said epoxy adhesive.

6. The bonded shaped body of claim 1 wherein said elastomer is a amine-terminated nitrile-butadiene copolymer and is present in part B of said epoxy adhesive.

7. The bonded shaped body of claim 1 comprising said epoxy compound at from 10 to 40 wt. %, said liquid elastomer at from 5% to 25% by weight, and said polyamide and/or polyamidoamine at from 10% to 30% by weight.

8. The bonded shaped body of claim 1 wherein said adhesive is formulated to also comprise an accelerator and an amine hardener.

9. The bonded shaped body of claim 1 containing from 22 to 30 wt. % combined of said elastomer and said polyamide and/or polyamidoamine.

10. The bonded shaped body of claim 1 which exhibits a bond strength of at least 200 p.s.i. at 180° F., and at least 44 p.s.i. at 400° F., and fiber tearing bonds after long term water soaking.

11. A two-part (A & B) dispenser comprising first and second containers containing epoxy adhesive in two parts A and B, and adapted to dispense the adhesive in volume proportioned parts, wherein said adhesive contains a reactive liquid elastomer having terminal epoxy-reactive groups, and wherein part A in said first container comprises an epoxy compound, and part B in said second container comprises a polyamide or polyamidoamine, wherein said adhesive contains from 20 to 60 wt. % combined of said elastomer and said polyamide and/or polyamidoamine, and said dispenser is adapted to dispense said adhesive in a volume mix-proportion (ratio) of part A to part B of from 1:1.4 to 1:3.0.

12. The dispenser of claim 11 wherein the adhesive exhibits, per se, a Young's modulus of from 25,000 to 200,000 in the cured state.

13. The dispenser of claim 11 adapted to dispense said adhesive in a mix-proportion of from 1:1.8 to 1:2.5.

14. The dispenser of claim 11 wherein said elastomer is a carboxy-terminated nitrile-butadiene copolymer and is present in part A.

15. The dispenser of claim 11 wherein said elastomer is a amine-terminated nitrile-butadiene copolymer and is present in part B.

16. The dispenser of claim 11 wherein said adhesive comprises said epoxy compound at from 10 to 40 wt. %, said liquid elastomer at from 5% to 25% by weight, and said polyamide and/or polyamidoamine at from 10% to 30% by weight.

17. The dispenser of claim 16 wherein said adhesive is formulated to further comprise an accelerator and an amine hardener.

18. The dispenser of claim 11 wherein said adhesive comprises from 22 to 30 wt. % combined of said elastomer and said polyamide and/or polyamidoamine.

* * * * *